UNITED STATES PATENT OFFICE.

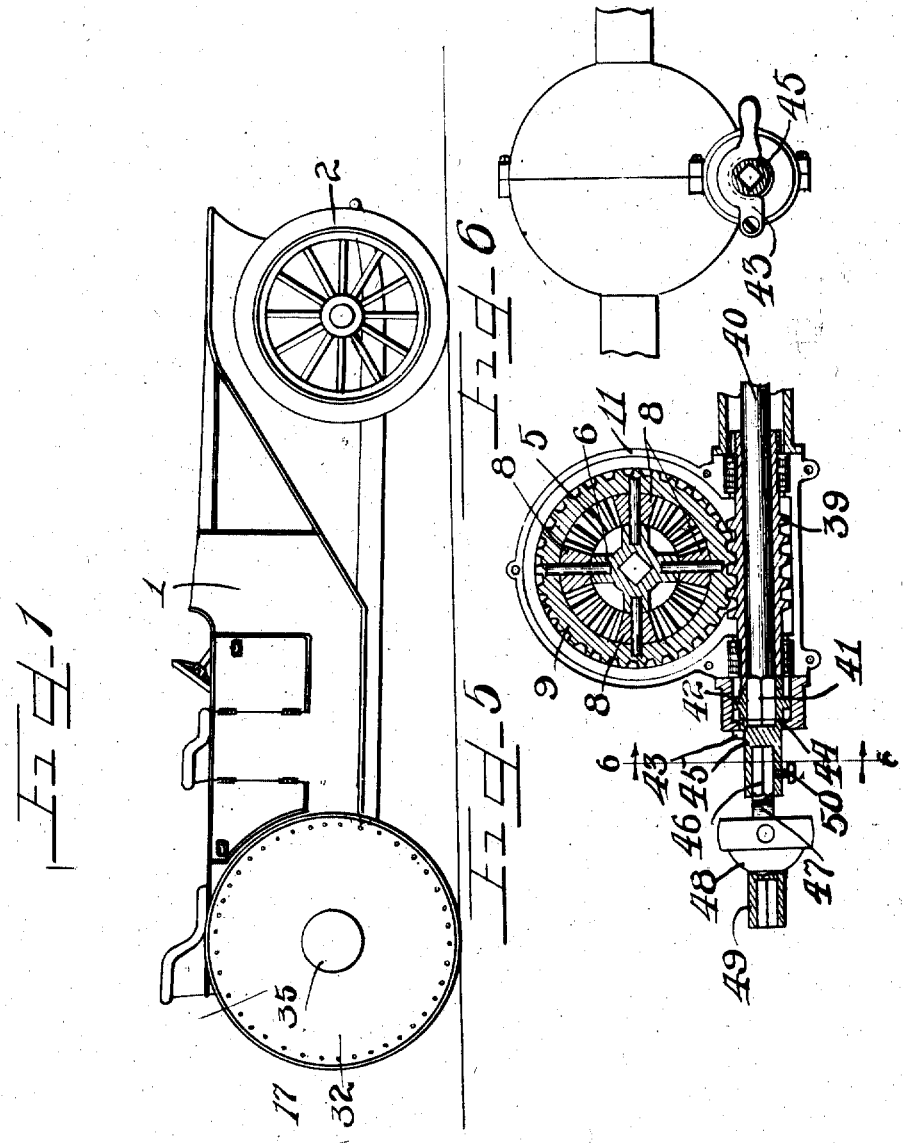

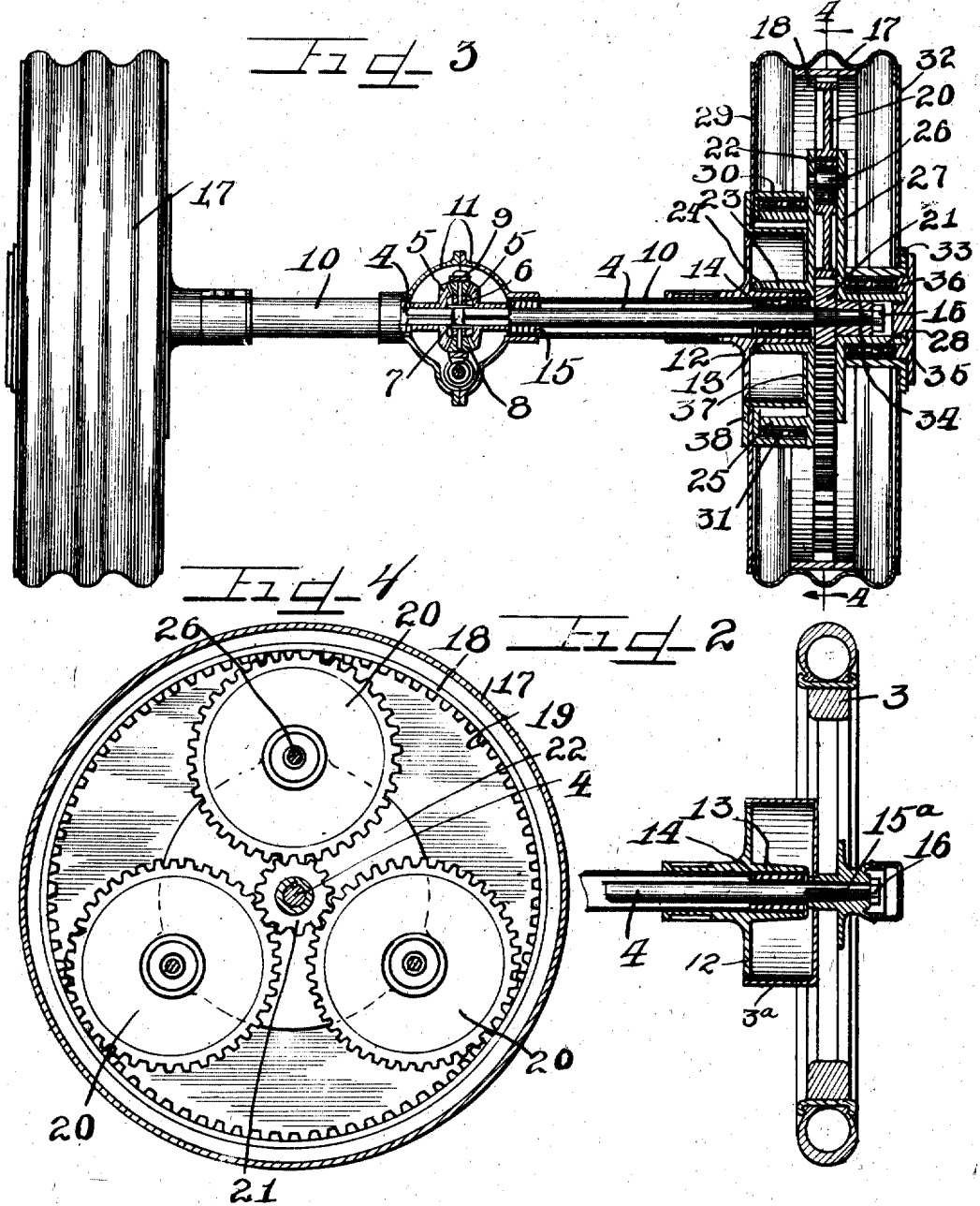

ALBERT E. COOK, OF ODEBOLT, IOWA, AND THOMAS VAN TUYL, OF KANKAKEE, ILLINOIS; SAID VAN TUYL ASSIGNOR TO SAID COOK.

TRACTOR AUTOMOBILE AND POWER PLANT.

1,232,505.   Specification of Letters Patent.   Patented July 10, 1917.

Application filed September 6, 1912, Serial No. 718,809.   Renewed October 16, 1916.   Serial No. 126,036.

*To all whom it may concern:*

Be it known that we, ALBERT E. COOK and THOMAS VAN TUYL, citizens of the United States, and residents of the city of Odebolt, county of Sac, and State of Iowa, and Kankakee, Kankakee county, Illinois, respectively, have invented certain new and useful Improvements in Tractor Automobile and Power Plants; and we do hereby declare that the following is a full, clear, and exact description of the same, reference being had to the accompanying drawings, and to the numbers of reference marked thereon, which form a part of this specification.

In the very extensive introduction into use of power vehicles or automobiles of various kinds, they have assumed a very few well defined types, and as a result none of such devices are capable of quick, efficient, and ready convertible use. The large majority of such devices are intended solely and distinctively for pleasure purposes. Another class are intended and designed for commercial purposes, and another class are solely tractors, or mere portable power plants, adapted for draft purposes, and, in some instances, equipped with a fly wheel or belt pulley whereby the power of the device may be applied for the running of machinery. Owing to the large expense of devices of the class, it rarely occurs that those having use for all three classes or types of said devices, are able to afford three separate and distinct machines, and in consequence, the owner of any of these classes of vehicles finds the same usually of little value or use for any purpose other than that for which it was distinctively designed and constructed.

The object of this invention is to afford a convertible automobile and power plant of the class described, adapted for use for pleasure purposes, and capable of being very quickly converted into a powerful tractor whereby heavy loads, or agricultural (or other) machines may be drawn.

It is also an object of the invention to so construct the device as to admit of delivering the full efficiency of its power plant to the driving of other machinery, without the necessity of propelling the vehicle.

The invention also has for its object a construction whereby the maximum power and efficiency of the power plant of the automobile, may be utilized as is usual with pleasure vehicles, or may be augmented by speed reductions for traction purposes, or may be delivered direct to the operation of machinery to aff d, in other words, a construction adapted for general and universal use, to the end that the maximum utility of the device may be attained through the varied uses to which the same is adapted.

The invention (in a preferred form) is illustrated in the drawings, and hereinafter more fully described.

In the drawings:

Figure 1 is a side elevation of an automobile, showing the same equipped as a tractor.

Fig. 2 is an enlarged, fragmentary, sectional detail of one of the rear automobile wheels, adapted for use when the device is used as a pleasure or ordinary commercial vehicle.

Fig. 3 is a detail view partly in section, and broken away, of the rear automobile axle, showing the tractor wheels thereon in lieu of the ordinary road wheels.

Fig. 4 is an enlarged, vertical section taken on line 4—4 of Fig. 3.

Fig. 5 is an enlarged detail of the worm gear drive and removable universal joint, and taken longitudinally of the shaft.

Fig. 6 is a section on line 6—6 of Fig. 5.

As shown in the drawings:

1, indicates an automobile as a whole, which is constructed sufficiently strong for general use as a pleasure or commercial vehicle, and which, of course, may have any type of body or may employ any of several bodies, as preferred, or a body, if desired, so constructed as to be convertible for pleasure or for commercial purposes. The axles may be constructed as usual, and provided with ordinary automobile wheels 2, shown as the front wheels in Fig. 1, shown as a rear wheel in Fig. 2. The rear axle, as shown in Fig. 3, comprises the alined axle sections 4, which are provided at their adjacent ends with inwardly facing bevel gears 5, rigidly keyed thereon, as shown in Figs. 3 and 5, and between which is secured a spider 6, which rotates around the sleeve 7, fitting therein and in which the ends of the shaft sections 4, are rigidly secured, as shown in Fig. 3. Said spider is provided with bevel pinions 8, four in number, which constantly intermesh said bevel gears, as shown in Figs. 3 and 5, and peripherally engaged around said spider and bevel pinions, is a rim 9, provided with teeth affording a worm gear.

As shown, a casing or sleeve 10, incloses each of the rear axle sections, said sleeves being connected at their inner or adjacent ends by means of a differential casing also constructed in sections 11, and rigidly bolted together around their periphery. Each of said sleeves 10, at its outer end, has rigidly secured thereon an outwardly facing collar 12, having an outwardly tapered hub 13, and roller bearings 14 and 15, are provided in said sleeve and collar hub to permit said shaft sections 4, to freely rotate independently of said casing.

When operated as an automobile, either for pleasure or for ordinary commercial purposes, the ordinary automobile wheel 3, is secured on the outer or extended end of the axle 4, conveniently by means of a key 15ª, and nut 16, in a familiar manner, and the brake drum 3ª, which is secured to the wheel, projects over and receives the flange of the collar 12 thereinto, as shown in Fig. 2. Such wheels, however, are deficient in tractive value for pulling heavy loads. I have therefore provided a tractor wheel adapted for engagement on said axle, and to be driven at a reduced speed thereby to augment power. Said wheel may be of any desired size, preferably materially larger than the automobile wheel (which it replaces) and is provided with a broad rim 17, which may be corrugated peripherally, if preferred, or provided with any means for affording suitable traction.

As shown, a band or ring of metal 18, is secured centrally within the tread of said wheel and is provided with teeth 19, to afford an internal rim gear, and meshing therewith within said wheel are three gear wheels 20, arranged equal distances apart therein, and each meshing with a pinion 21, adapted to be rigidly keyed on the extended end of said axle shaft section, as shown in Figs. 3 and 4, and also to be held in place thereon by means of the nut 16. Within said wheel is a collar 22, of large diameter, provided with a hub 23, shaped complementally with the hub 13, of the collar 12, and adapted to fit thereover and to be rigidly engaged thereto by means of a key 24, as shown in Fig. 3.

Secured on said collar 22, is a flange 25, concentric with the axle and said wheel, and which projects inwardly toward the differential. Said gear wheels 20, are journaled in suitable bearings upon short shafts 26, the ends of which are secured respectively in the rim of the collar 22, and in the rim of a corresponding collar 27, at the outer side of said gear wheels, the hub 28, of which fits upon the hub of said pinion 21, which is journaled therein, as shown in Fig. 3.

Secured at the inner side of the wheel rim is an annular plate 29, which extends inwardly beyond the flange 25, and within which is engaged an annular flange 30, concentric with said wheel, and between which and the flange 25, are engaged anti-friction or roller bearings 31. In a similar manner, the outer face of said wheel is covered and closed by a metallic plate 32, rigidly secured on the rim 17, as shown in Fig. 3, and in which is secured at the center, a sleeve 33, between which and the hub 28, of the collar 27, are rollers 34, affording an anti-friction bearing.

As shown, a plug or hub cap 35, is threaded into the hub 28, of said collar 27, and is provided with a concentric rib 36, which extends into the space between said hub 28, and sleeve 33, to hold the rollers of said roller bearing from end play. As shown also, a brake drum 37, constructed of pressed or cast steel (or other suitable metal) is secured within the wheel, the flange 38, thereof, being riveted or otherwise rigidly secured to the inner plate 29, of said wheel, said drum fitting over the usual or any rear wheel brake adapted to coöperate therewith, and over which the brake drum slides when the wheel is inserted into place. The brake mechanism is omitted for convenience of illustration, but any expansion brake will suffice.

In the construction a worm gear drive is illustrated. For this purpose, the differential casing comprising the sections 11, is extended downwardly below the worm gear to afford also a casing for the worm 39, which meshes at all times with the worm gear 9, on said differential. Said worm is provided with a cylindric bore therethrough in which is journaled the shaft 40, from the engine, and the outer end of said worm is shaped to afford one member of a spur or other suitable clutch. The outer end 41, of the engine shaft 40, is angular, and slidably engaged thereon is a clutch member 42, complemental with the clutch member afforded by the end of the worm, and adapted when engaged therewith, to drive said worm thereby.

Mounted upon the end of the differential and worm gear casing, is a lever 43, adapted to swing transversely the worm shaft, and adapted to engage in a peripheral groove 44, in said sliding clutch member 42, to hold the same retracted from the worm or adapted to engage transversely the end of said clutch member to hold the same in driving engagement with the worm, as shown in Figs. 5 and 6. As shown, said sliding clutch member is provided with an integral rearwardly directed extension 45, in axial alinement with the shaft 40, and having an angular socket therein adapted to receive the angular end 46, of a short shaft provided at its outer end with one member 47, of a universal joint, and having coupled therewith the other member 48, of said universal joint, from which extends a short shaft section 49, provided with an angular socket therein to receive the angular end of the slip shaft. As shown, said universal joint section may be removably engaged in the socketed shaft extension 45, of the worm gear by means of a set screw 50, by releasing which said universal joint may be entirely removed when not required for use.

The operation is as follows:

When it is desired to utilize the automobile for driving other machinery, it is only necessary to insert the angular end of the shaft 46, for the universal joint, into the angular socket in the shaft section 45, where the same may be engaged by the set screw 50. Any suitable shaft having an angular end, may then be inserted in the socketed extension 49, at the other side of the universal joint, and connected as desired to drive the particular machine. In this manner, the power plant of the automobile may be utilized for pumping, for driving, or for operating machinery of any kind, and without driving the wheels of the automobile, or requiring the same to be jacked up.

Of course, when so driving, the clutch member 42, is retracted, and held in retracted position by the engagement of the lever 43, in the groove 44, therein, so that the shaft 40, is journaled in the worm and does not drive the same. Should it be desired to utilize the automobile as a tractor, for example, for the operation of farm or other agricultural machinery, including plows or the like, the rear axle is elevated, and the automobile wheels 3, removed, and the hub and the tractor wheels substituted therefor. For this purpose, a suitable key is inserted in a seat therefor in the hub of the collar 12, and the tractor wheel is forced into place with the hub 23, of the collar 22, receiving said key 24, thereinto, and thereby rigidly engaging the hub of said collar 22, upon the hub of the collar 12, as shown in Fig. 3, at the same time the pinion 21, is forced over the key 15ᵃ, in the end of the shaft, the nut 16, is secured in place, and the machine is ready for use.

The drive now is applied through the axle shaft section 4, through the pinions 21, thence with the gear wheels 20, and through the rim gear 19, enabling the full power of the power plant to be applied directly to the axle shaft sections 4, but affording a large speed reduction and consequent augmentation of power by the use of the interior wheel drive for the tractor wheels, and permitting the direct connected drive from the engine to the axle and affording maximum efficiency thereby, by vastly multiplying the power.

Should it be desired, the usual automobile transmission gear may be employed to further augment the power delivered to the pinion 21, and thence to the tractor wheels. Inasmuch as the interior collar 22, is rigidly secured upon the hub 13, of the collar 12, and the outer collar 27, fits over the extended hub of the pinion 21, which rotates therein, it is to be observed that the stresses due to the inequalities of the surface and to the weight of the tractor wheels (the latter of which, however, need not be excessive) is carried to the axle sleeve and housing, thus permitting a relatively light axle shaft to be used for any desired weight or size of tractor wheel. This also permits the drive to be delivered to the extreme periphery of the tractor wheel without exerting any other stress on said shaft than the mere torsion occasioned by the drive, such torsion also being reduced to a minimum owing to the small size of the pinion as compared with the internal gear 19, within the wheel. It is to be observed that no change whatever is necessitated to permit the tractor wheel to be applied in lieu of the automobile wheel or vice versa, and the machine may be constructed with either as the normal wheel, and the other as the wheel to be substituted.

It will also be observed that the axle 4, while it both supports and drives the ordinary automobile wheel 3, and also drives the tractor wheel 17 when the latter replaces the wheel 3, yet said axle does not support the tractor wheel 17, the latter being carried by and rotating on parts carried by and rigid with the sleeve 10 and forming a separate and preferably non-rotative axle for said tractor wheel.

In operation, the steering is effected by the front wheels of the automobile, as usual. The body (a mere conventional body being shown in the drawings) may be of any preferred type, and adapted for the carriage of commodities or for passengers, pleasure or otherwise, as preferred. It is to be understood, of course, that details of the construction may be varied. We therefore do not purpose limiting ourselves otherwise than necessitated by the prior art.

We claim as our invention:

1. An automobile embracing a rear axle, a strong non-rotative casing inclosing the same to near its outer end, a brake drum collar on said casing, tractor wheels adapted for engagement on said axle comprising a non-rotative spider adapted to be rigidly engaged on the end of said sleeve to said collar, a pinion rigidly keyed on the end of said axle, gear wheels carried on said spider and intermeshing said pinion, and internal peripheral gear teeth in the rim of the wheel also engaged by said gear wheels, and whereby the tractor wheels are driven by the rotation of said axle and are carried on the axle sleeve.

2. In an automobile a rear axle, a sleeve incasing the same to near each outer end thereof, a brake drum collar rigidly secured on said sleeve at each end thereof, a hub thereon extending to the end of the sleeve, a pinion rigidly but detachably engaged on said axle beyond the sleeve, an outwardly directed hub thereon, a spider comprising inwardly facing hub collars engaging said pinion therebetween, one of the hubs thereof rigidly engaged on the brake collar hub, the other of said hubs journaled on said pinion hub, gear wheels journaled between said collars and meshing said pinion, a traction wheel rim having a central internal gear meshing said gear wheels, and journaled upon the spider by means affording an anti-friction bearing, and differential mechanism connected in said axle to permit independent action of said wheels.

3. In a device of the class described the rear axle, and the end casing sleeve therefor extending to near each end thereof, an outwardly hubbed brake drum collar on each end of said sleeve, an outwardly hubbed pinion adapted for rigid but detachable engagement on the extended end of the axle, a spider partly inclosing said pinion and rigidly but releasably engaged on the hub of the brake drum collar at one side the pinion and at the other affording a journal bearing for the hub of said pinion, gear wheels journaled on said spider and meshing with said pinion, a traction wheel embracing a rim, a central internal gear in said rim meshing said gear wheels, a concentric inwardly directed flange on the inner side of said spider intermediate the axle and wheel rim, side plates rigidly secured to the rim, an inwardly directed central hub in each and receiving the outer spider hub and the inner spider flange therein respectively, roller bearings engaged therebetween, and an inset brake drum engaged in the inner face of said wheel concentrically therewith and adapted to fit over the brake drum collar.

4. The combination with an automobile, its rear axle, and the non-rotative casing and sleeve therefor, of a traction wheel carried wholly upon said sleeve, and having an internally geared inner periphery, a pinion rigidly secured upon the end of the axle, gear wheels 120° apart journaled in the plane of the wheel to mesh with said geared rim and said pinion simultaneously and rigidly held from planetary movement, and means permitting independent differential action for said wheels.

5. In a device of the class described the automobile and its rear axle and incasing sleeve, of a traction wheel adapted for quick engagement and disengagement on said axle and embracing a spider rigidly secured on said sleeve, a pinion rigidly secured on the extended end of the axle, an internal gear in the wheel rim, gear wheels disposed 120° apart and journaled in the plane of the internal gear intermeshing said pinion and rim gear simultaneously, means engaging said rim to permit of rotation of said rim with reference to said spider and acting to hold said rim from movement longitudinally with the shaft, and a differential gear engaged in said axle.

6. In a device of the class described embracing the automobile, its rear axle and the incasing sleeve therefor and the differential gear on said axle, of an internally geared traction wheel carried upon the end of the incasing sleeve, a plurality of speed reducing gears disposed in and meshing with said wheel, and a pinion rigidly secured upon said axle and meshing with each of the speed reducing gears in the wheel.

7. The combination with a worm driven differential of means disconnecting the drive from the worm thereof, of tractor wheels adapted to be driven by said differential embracing an interior annular gear secured to said tractor wheels, and a plurality of intermeshing gears all disposed within the tractor wheels in the planes thereof adapted to transmit the drive from the differential to said annular gear to drive the tractor wheels.

8. The combination with a worm driven differential, of means disconnecting the worm from said differential, and tractor wheels adapted to be driven by said differential, alined axle sections extending into said differential, pinions detachably connected on the outer ends thereof, annular gears within said tractor wheels, and a plurality of pinions intermeshing with said central axle pinions and said annular gears to transmit the drive from the differential to the tractor wheels.

9. In an automobile having a rear axle and an incasing bearing sleeve therefor, of a quickly detachable automobile wheel adapted to be secured upon the extended end of said axle, and an internally geared tractor wheel adapted to be carried wholly upon the end of the inclosing sleeve and to be driven by said axle.

10. In an automobile, the combination with a chassis, a power plant thereon, and a rear axle driven by said power plant and adapted to carry the rear driving-wheels which are driven at the speed of the axle, of traction wheels capable of performing the work of said driving wheels when the latter are removed and supporting the rear of the automobile with its front wheels upon the ground, and connections between said axle and traction wheels for transmitting power from the one to the other, said connections embodying a speed reducing mechanism.

11. A tractor, embodying an automobile chassis, its power plant, its front wheels, and its rear axle adapted to be driven by said power plant, of supplemental rear driving wheels adapted to perform the work of the automobile rear wheels when the latter are removed, and connections between said rear axle and said supplemental driving wheels for transmitting power from the one to the other, said connections embodying a speed reducing mechanism.

12. A tractor, embodying an automobile chassis, its power plant, its front wheels, and its rear axle adapted to be driven by said power plant, of supplemental rear driving wheels adapted to be substituted for the automobile rear wheels and upon said rear axle, and connections between said rear axle and said supplemental driving wheels for transmitting power from the one to the other, said connections embodying a speed reducing mechanism.

13. In an automobile, the combination with a chassis, a power plant thereon, and a rear axle driven by said power plant and adapted to carry the rear driving wheels which are driven at the speed of the axle, of a separate axle, traction wheels mounted on said separate axle and capable of performing the work of said rear driving wheels when the latter are removed and supporting the rear of the automobile with its front wheels on the ground, and connections between said rear driving axle and traction wheels for transmitting power from the one to the other, said connections embodying a speed reducing mechanism.

14. In an automobile, the combination with a chassis, a power plant thereon, and a rear axle driven by said power plant and adapted to carry the rear driving wheels which are driven at the speed of the axle, of traction wheels capable of performing the work of said driving wheels when the latter are removed and supporting the rear of the automobile with its front wheels upon the ground, and speed reducing gearing disposed within the periphery of said traction wheels and geared to said driving axle for transmitting power from said axle to said wheels.

In testimony whereof we have hereunto subscribed our names in the presence of two subscribing witnesses.

ALBERT E. COOK.
THOMAS VAN TUYL.

Witnesses:
CHARLES W. HILLS, Jr.,
GEORGE R. MOORE.